United States Patent [19]

Bignell et al.

[11] Patent Number: 5,553,505
[45] Date of Patent: Sep. 10, 1996

[54] ELECTRONIC FLUID FLOW METER

[75] Inventors: Noel Bignell, Annandale; Anthony F. Collings, Turramurra; Kenneth J. Hews-Taylor, West Pymble; Barry J. Martin, Guildford; Colin W. Braathen, Naremburn; Charles M. Welsh, Kariong, all of Australia

[73] Assignee: Commonwealth Scientific and Industrial Research Organization, Campbell, Australia

[21] Appl. No.: 175,361

[22] PCT Filed: Jun. 25, 1992

[86] PCT No.: PCT/AU92/00314

§ 371 Date: Mar. 15, 1994

§ 102(e) Date: Mar. 15, 1994

[87] PCT Pub. No.: WO93/00569

PCT Pub. Date: Jan. 7, 1993

[30] Foreign Application Priority Data

Jun. 25, 1991 [AU] Australia .................. PK6893

[51] Int. Cl.⁶ ...................................................... G01F 1/00
[52] U.S. Cl. ...................................... 73/861.28; 73/861.27
[58] Field of Search .................. 73/861.27, 861.28, 73/861.29, 861.31

[56] References Cited

U.S. PATENT DOCUMENTS

| | | | |
|---|---|---|---|
| 3,282,101 | 11/1966 | Yamamoto | 73/194 |
| 4,022,058 | 5/1977 | Brown | 73/861.28 |
| 4,480,485 | 11/1984 | Bradshaw | 73/861.28 |
| 4,603,589 | 8/1986 | Machida | 73/861.28 |

FOREIGN PATENT DOCUMENTS

| | | |
|---|---|---|
| A3624589 | 1/1990 | Australia . |
| A6475590 | 5/1990 | Australia . |
| 0452531 | 10/1991 | Germany ........... 1/1 |
| 57-190281 | 11/1982 | Japan . |
| WO8602722 | 5/1986 | Netherlands . |
| WO8802124 | 3/1988 | Sweden . |

Primary Examiner—Richard Chilcot
Assistant Examiner—Ronald Biegel
Attorney, Agent, or Firm—Dressler, Goldsmith, Shore & Milnamow, Ltd.

[57] ABSTRACT

An electronic fluid flowmeter includes an LSI digital device and an LSI analog device. The digital device drives a pair of acoustic transducers to transmit acoustic waves within a fluid, the flow of which is being measured. The acoustic waves are received within the analogue device, the moment of arrival being determined by envelope detection associated with the phase of the received signal. The reception of a signal stops a counter within the digital device, the value in the counter representing the time of flight of the acoustic signals within the fluid. Fluid flow data can be stored on an EEPROM from which meter data can be read using a liquid crystal display or via an interface port to an external device.

33 Claims, 8 Drawing Sheets

ELECTRONIC FLUID FLOW METER

FIELD OF INVENTION

The present invention relates broadly to an electronic fluid flow meter and, in particular, to a gas meter for domestic and commercial use.

BACKGROUND TO THE INVENTION

Traditional fluid flow meters in domestic and commercial use generally include some mechanical arrangement such as a bellows, or a vane or impeller which actuates a totalising mechanism. Generally, a mechanical dial arrangement indicates the total volume of fluid that has passed through a meter. Such mechanical arrangements are not highly accurate, especially at low flow rates, such as those required to maintain a gas pilot light. Accordingly, inaccuracies in low flow rate measurement can represent a substantial loss of income to the supplier of gas, and water.

Over recent years, there have been a number of proposals that utilise electronics technology so as to provide for substantially higher accuracy of the fluid flow measurement. Such systems generally incorporate ultrasonic transducers that transmit ultrasonic signals both upstream and downstream to measure the times of flight of the signals, from which the relative speed of the fluid can be calculated. Examples of such devices for use in measuring liquid flow rates, are found in U.S. Pat. Nos. 3,898,878 and 3,329,017 which use amplitude based measurement. U.K. Patent Application No. GB 2,222,254 A identifies that amplitude measurement is generally not practical in gas flow measurement due to substantial variations In amplitude between the transducers. This results in it being difficult to detect the moment of time when a signal is received and thereby accurately determine the time of flight. GB 2,222,254 A disclosed a system which used ultrasonic signals transmitted as packets whereby a phase change is inserted into the middle of each packet, and thus represents an identifiable timing marker from which the time of flight can be calculated.

However, problems arise with the detection of a phase change when measuring fluid flow in a small duct or conduit because the ultrasonic signal is reflected by the wall(s) of the duct which causes multipath propagation. The multipath propagation effectively alters the phase relationship of energy reaching the receiving transducer, and hence, the timing of the phase change is not reliably detectable. Also, the transission of high order acoustic modes, which propagate at speeds lower than the primary wave packet, cause interference with succeeding signals. This can lead to further errors.

It is an object of the present invention to substantially overcome or ameliorate, some or all of the problems of the prior art.

DISCLOSURE OF THE INVENTION

In accordance with a first embodiment of the present invention there is disclosed a method of detecting the time of arrival of an acoustic wave packet transmitted at a particular frequency, said method comprising the steps of detecting the wave packet and forming a received signal therefrom, rectifying and filtering the received signal to form an envelope signal, detecting when said envelope signal crosses a detection threshold to thereby enable the detection of a transition across a predetermined level by said received signal, the transition across said predetermined level representing a determinable number of cycles of said received signal at said particular frequency after the arrival of said acoustic wave packet.

In accordance with a second embodiment of the present invention there is disclosed an electronic fluid flow meter comprising first and second transducers locatable within a fluid, transmitter means for energising one of said transducers to cause emission of one or more acoustic wave packets therefrom for reception by the other said transducer, control means connected to said transmitter means for reversing the direction of transmission of said acoustic wave packets, timer means connected for enablement to said control means for measuring a time of flight of each said acoustic wave packet, said timer means being stopped by a trigger signal output from a receiver means connected to said transducers, said receiver means detecting an increasing envelope of a received signal and upon the passing of predetermined threshold by said envelope, said trigger signal is output upon the next transition across a predetermined level by said received signal.

Generally, a selected one or more of the plurality of acoustic wave packets is transmitted having its phase or polarity inverted with respect to immediately adjacent wave packets. This substantially reduces the effects of propagating high-order acoustic modes which interfere with the detection of the arrival of the wave packets and cause errors in the actual time of detection.

Generally, the predetermined level is a zero-crossing obtained from a zero-crossing detector.

From a Known separation of the transducers, and from a calculated average of the times of flight, fluid flow calculations can be made. Preferably, the fluid flow meter incorporates a memory means in which fluid flow data can be stored. Also preferably, the fluid flow meter also includes an interface means adapted to transfer data stored in the memory means to another device.

Typically, the electronic fluid flow meter is battery operated, although mains supply can be used, and is enclosed within a housing configured to minimise an increase in temperature within the housing that would affect the operation of electronics components within the fluid flow meter. Thermal compensation means can also be provided to electronically compensate for changes in temperature both of the fluid, and within the housing.

For domestic applications metering a gas supply, the preferred embodiment is battery powered and includes various arrangements to reduce energy consumption and thereby ensure long life of the batteries. For example, high frequency clocks are generated from low frequency crystals which consume substantially less power than their high frequency counterparts. Also, high gain, low Q transducers are preferred which reduce the power required to drive them and thereby reduce energy consumption.

The preferred embodiment provides substantially linear results for rates of 0–7 cubic meters per hour. For a 12.5 mm tube, the accuracy is generally between 0.1 l and 0.15% and no greater than ±2% for the top 75% of the flow range. These performance figures are suitable for the economic metering of a pilot gas flow of 13 liters per hour.

BRIEF DESCRIPTION OF THE DRAWINGS

A preferred embodiment of the present invention will now be described with reference to the drawings in which.

BEST AND OTHER MODES OF CARRYING OUT THE INVENTION

Figure 5:
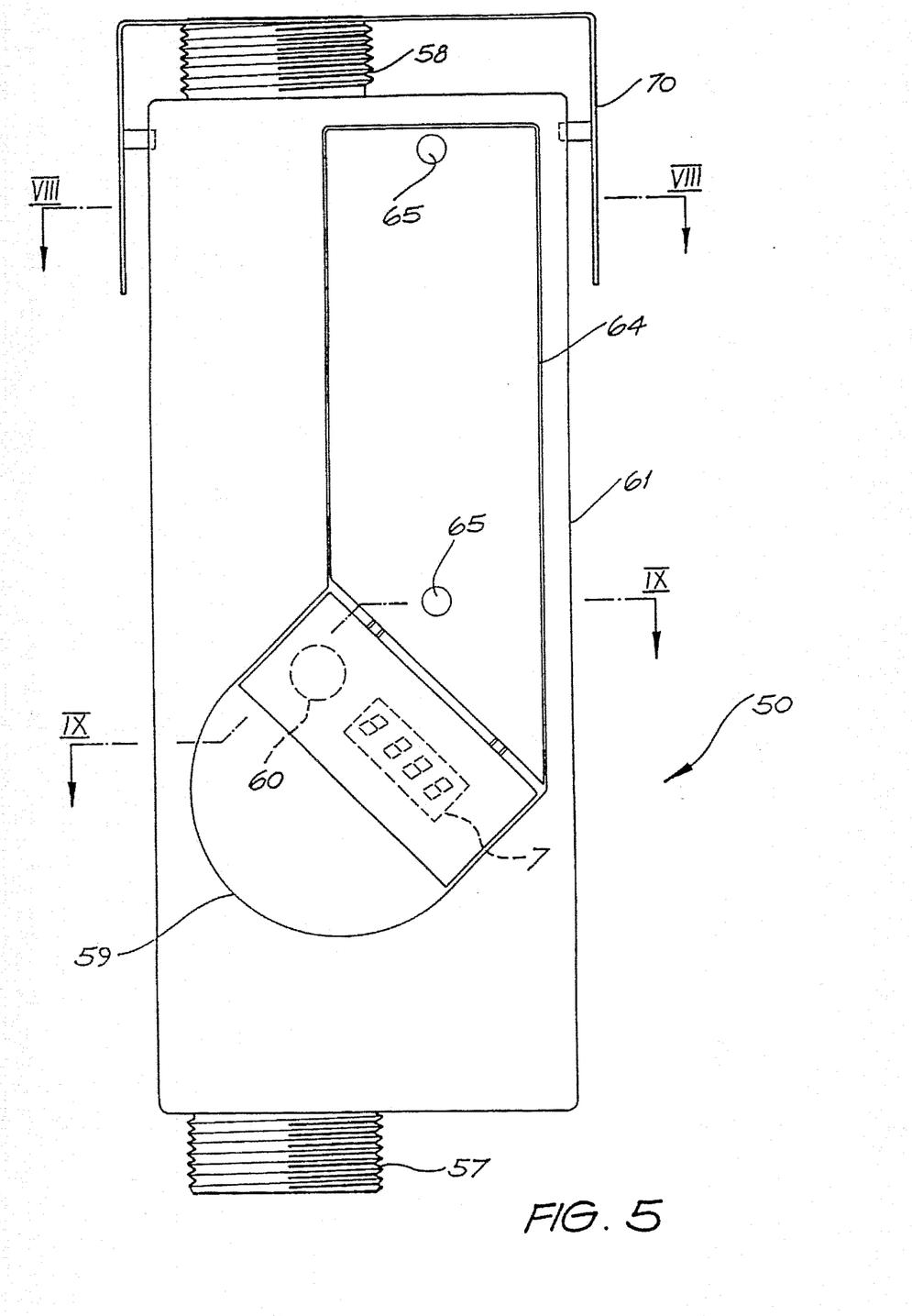
FIG. 5 is a front elevation view of the gas meter housing.

The preferred embodiment is a domestic gas meter 50, generally seen in FIG. 5, which is battery powered by one 3.5 volt D-size lithium battery 51 (FIG. 8) to give a service life of about 8 years.

Figure 6:
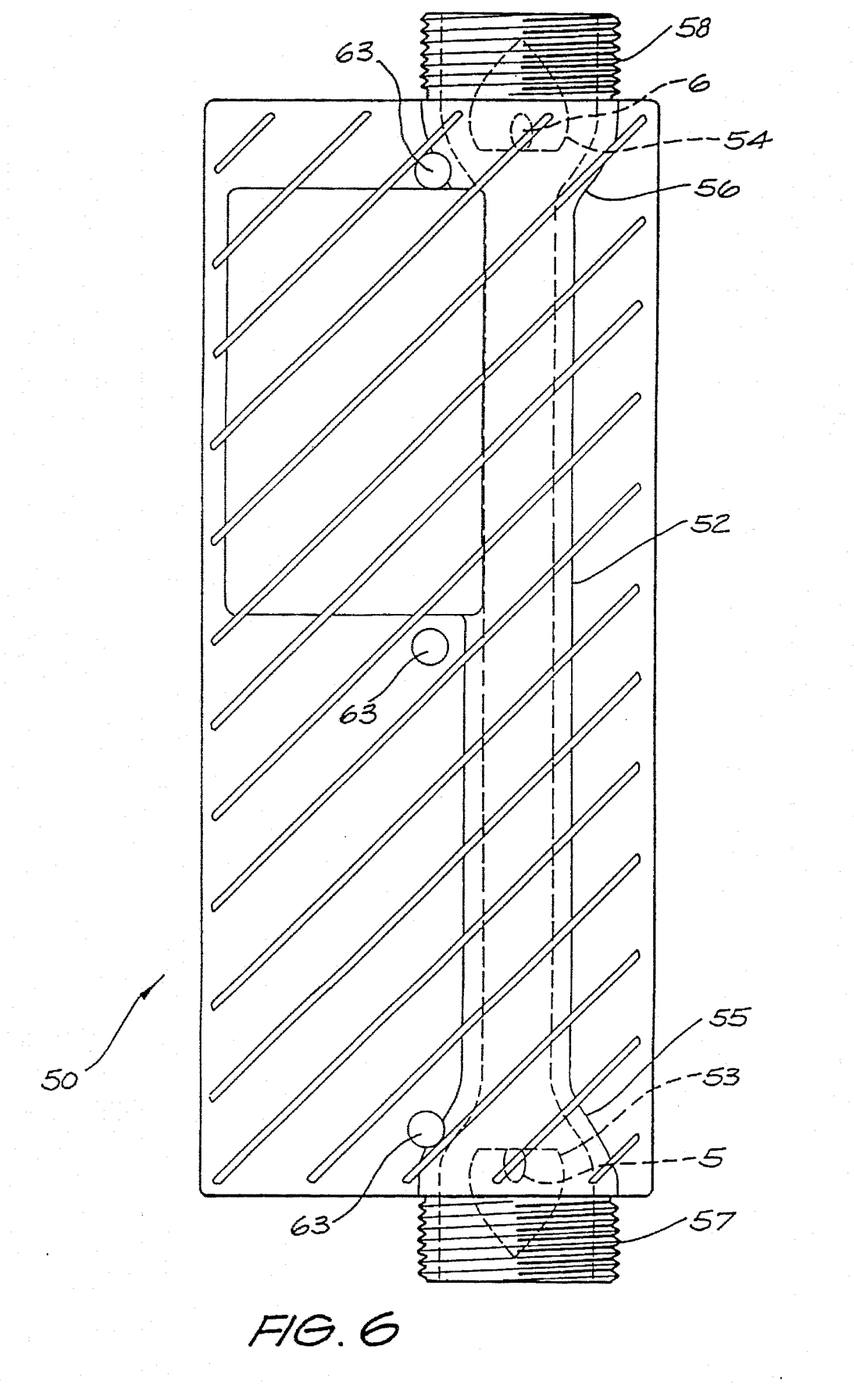
FIG. 6 is a rear elevation view of the gas meter housing.

The meter 50 directly measures the velocity of a gas stream by determining the time of travel in both directions of bursts of ultrasound in a tube 52 through which the gas flows, seen in FIG. 6, of known diameter and length. Ultrasonic transducers 5 and 6 are arranged within respective aerodynamic housings 53 and 54 (seen in phantom in FIG. 6) at each end of the tube 52 and can function either as ultrasound emitters or detectors. The tube 52 has a 14.0 mm internal diameter and is insertable, via appropriately flanged portions 55 and 56 having threaded connections 57 and 58 respectively, into a standard 25 mm (1 inch) gas pipe (not illustrated). In the preferred embodiment, the transducers 5 and 6 are spaced apart by a distance of 175 mm.

A suitable type of transducer that can be used with the preferred embodiment is that disclosed in International Patent Application No. PCT/AU91/00157.

The gas volumetric rate under flowing conditions can be readily calculated from the measured velocity and the dimensions of the tube 52 as generally known in the art. To achieve a desirable accuracy, a number of ultrasonic bursts or packets are sent In sequence, with the start of each new burst being triggered by the arrival of its predecessor at the detector end of the measuring tube. The average travel time is then determined by timing the sequence as a whole and dividing by the number of bursts transmitted. The generation, emission and detection of single ultrasonic burst will henceforth be referred to as a "ringaround". A single scan of the gas flow consists of two sets of a predetermined number of ringarounds, first in one direction and then in the other. The interval between scans is chosen so as to obtain the required accuracy over the period between meter readings. For a domestic meter a suitable interscan interval is typically sixteen seconds.

The meter 50 is provided with an electronics package which generates, detects, and times the ultrasonic bursts. The preferred embodiment as described herein is built around two LSI application specific integrated circuits, an analogue device 2 and a digital device 1. The functions of both the devices 1 and 2 can however be incorporated onto a single LSI device, as Known to those skilled in the art, which would reduce the unit cost of the electronics package.

Figure 1:
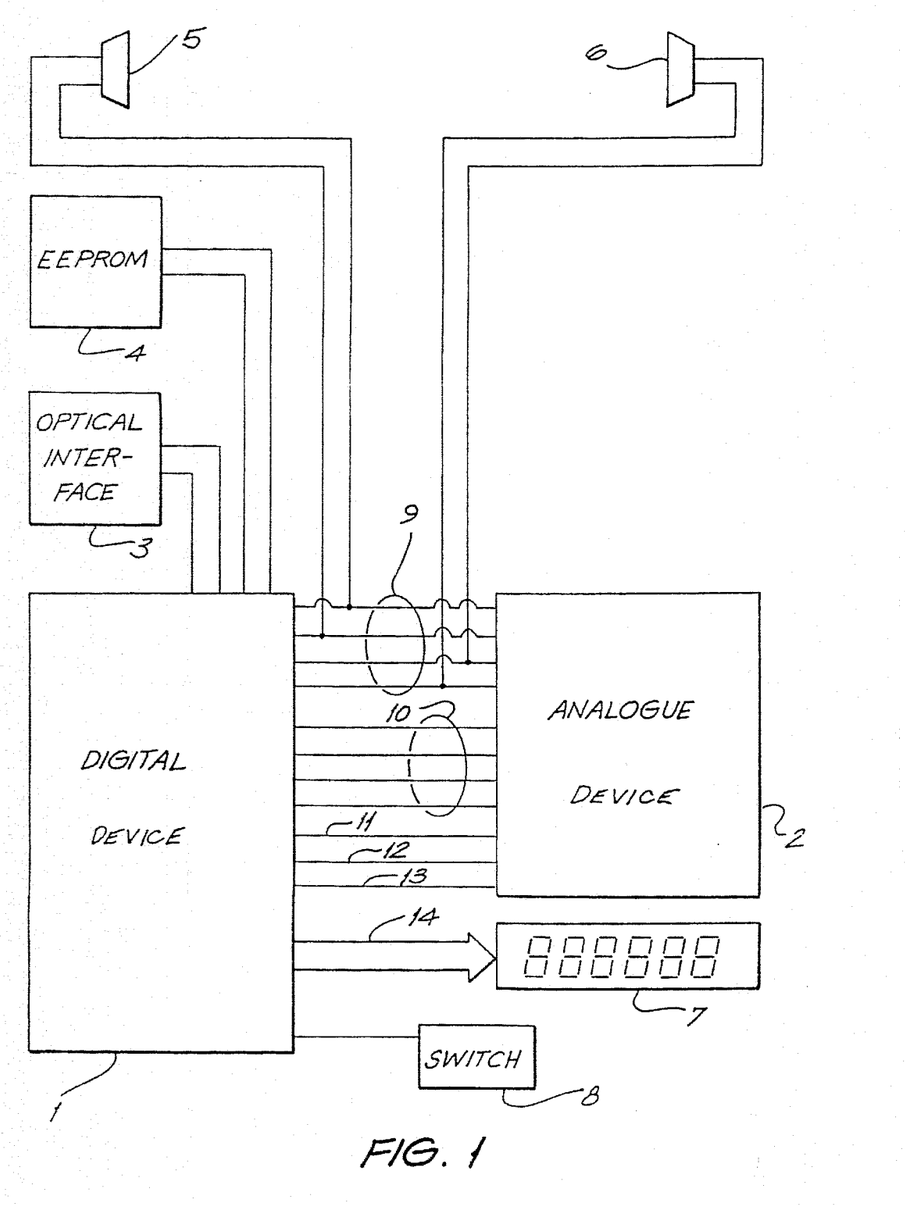
FIG. 1 is a block diagram of the electrical arrangement of a gas meter of the preferred embodiment.

FIG. 1 shows an overall block diagram of the electronics package. The digital device 1 controls, via a number of control lines 10, the analogue device 2, as well as two ultrasonic transducers 5 and 6, liquid crystal display (LCD) 7 and an optical interface 3. The transducers 5,6 are physically arranged within the gas-carrying tube 52 as seen in FIG. 6. An EEPROM 4 (Electronically Erasable Programmable Read-Only Memory) provides calibration information for the meter 50, and a Reed switch 8 is attached to a protective cover 59 over the LCD 7 (seen in FIG. 5) so as to switch on the LCD 7 when the cover 59 is opened.

A number of the lines 9 between the digital device 1 and the analogue device 2 allow transmission of electrical pulses from the digital device 1 to the transducers 5 and 6, and also allow the passage of the received signals to the analogue device 2. A line 11 carries an amplified version of the received signal from the analogue device 2 to the digital device 1. A line 12 carries a feedback signal, used for gain control and timing purposes, to the digital device 1. A reference voltage, generated on the analogue device 2, is carried to the digital device 1 by line 13. The optical interface 3 includes a window 60 (shown in phantom in FIG. 5) under the protective cover 59 and preferably contains a PIN diode and a light-emitting diode (not illustrated but known in the art) to allow reception from, and transmission to, outside devices via an infra-red serial link. A parallel connection of lines 14 interconnects the digital device 1 with the LCD 7.

Figure 2:
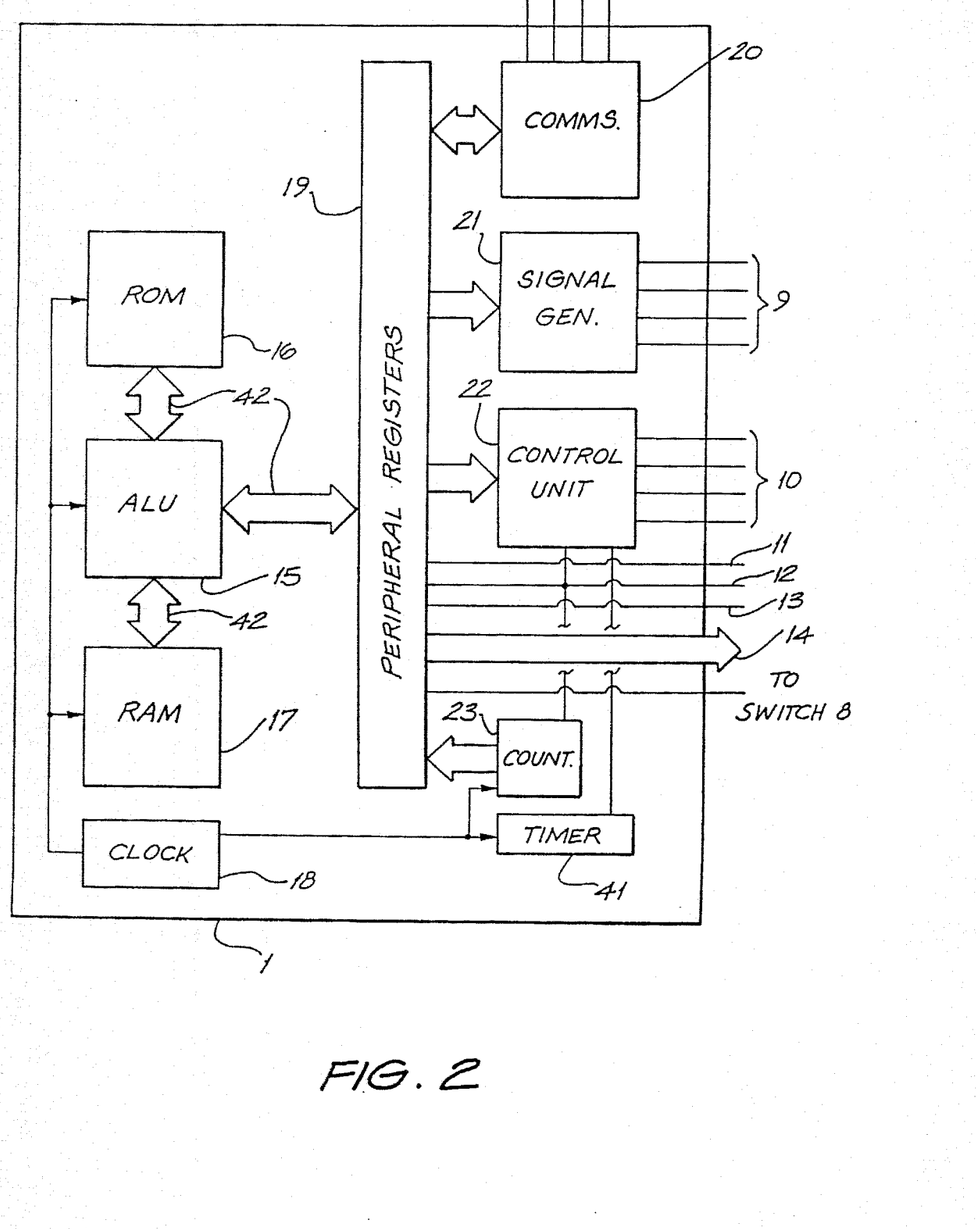
FIG. 2 is a block diagram of the digital device of FIG. 1.

As seen in FIG. 2, the digital device 1 includes an arithmetic logic unit (ALU) 15 which communicates via address and data buses 42 with a read-only memory (ROM) 16, a random access memory (RAM) 17, and an array peripheral registers 19. Preferably the ROM 16 has a capacity of 4096 bytes, whilst the RAM 17 consists of two register files of 128 bytes each. The peripheral registers 19 allow the ALU 15 to communicate with special-purpose logic functions on the device 1, as well as with other devices connectable to the digital device 1.

A clock unit 18 provides a clock frequency of 9.8304 MHz to a high-speed counter 23, as well as a 2.4576 MHz CPU clock for the ALU 15, and other sub-multiples for communication purposes. In addition, the clock unit 18 provides a 32.768 KHz signal for use as a real-time clock. The high-speed counter 23 is provided with a connection to the feedback line 12 to allow the counter 23 to be stopped when appropriate with its contents then being made available to the ALU 15 via the peripheral registers 19. A control unit 22 provides control signals to the analogue device 2 to direct its operation during the scan process.

A signal generator 21 outputs an ultrasonic signal on one of the two pairs of signal lines 9. The frequency of oscillation of the signal generator 21 is set by external timing components consisting of two resistors and a capacitor (not shown illustrated). The generator 21 is designed so that the width of the first pulse is the same width as subsegent pulses. The operation of signal generator 21 is similar to the 555 timer, known to those skilled in the art. A communications unit 20 provides two channels of communication, the first of which being serial link with the EEPROM 4, whilst the second provides a serial RS232-format link with external communication devices through the optical interface 3.

Figure 3:
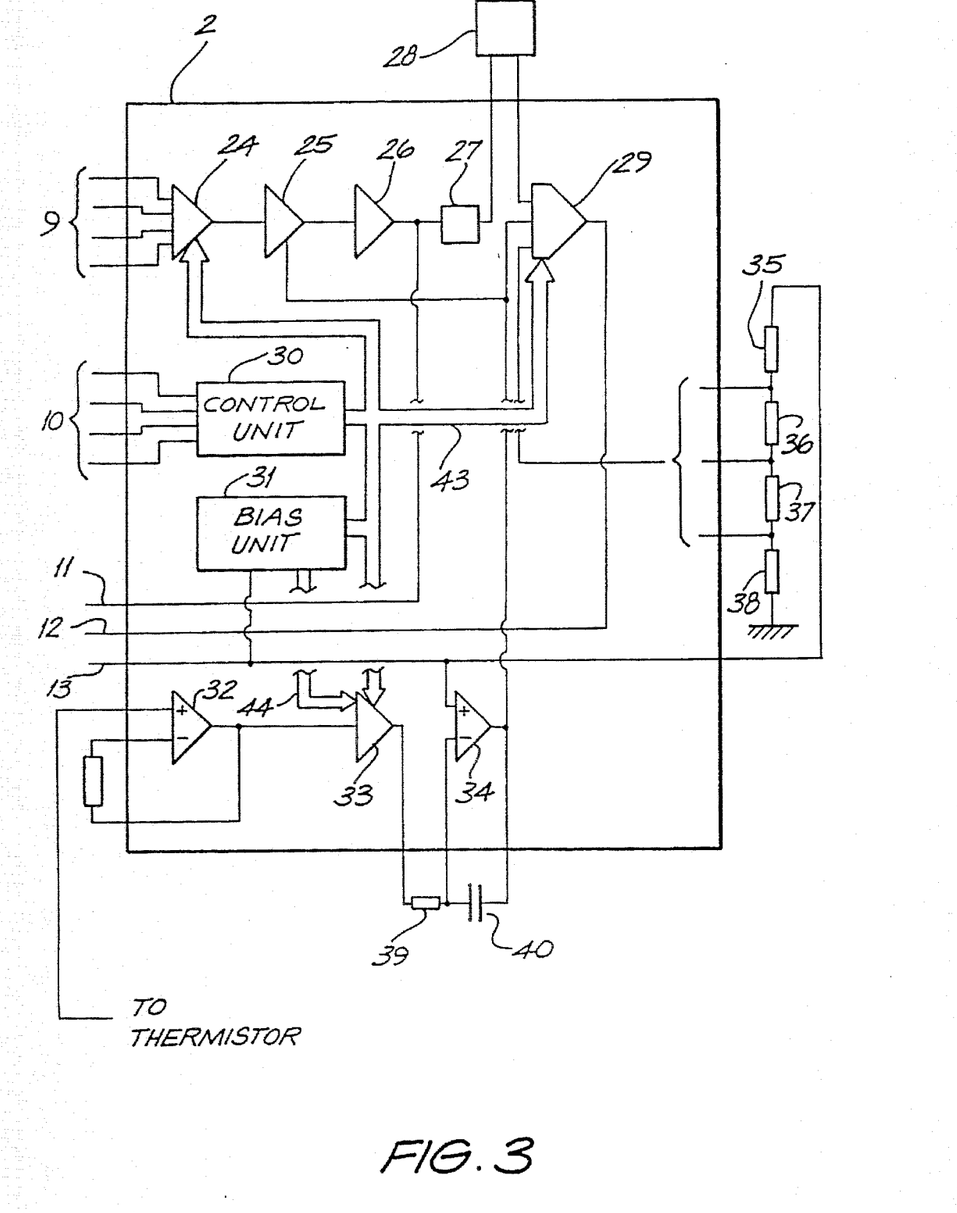
FIG. 3 is a block diagram of the analogue device of FIG. 1.

As seen in FIG. 3, the analogue device 2 has a preamplifier 24 which takes the received signal from one of transducers 5 or 6 via one of the pairs of lines 9, and provides an amplified signal to an automatic gain controlled (AGC) amplifier 25. The control voltage for AGC amplifier 25 is obtained from an external capacitor 40. A filter amplifier 26 drives a full-wave precision rectifier 27, and an RC network 28 filters the resulting signal and extracts the shape of the rising portion of the signal envelope of the received signal. The output of the filter amplifier 26 is also passed via line 11 to the digital device 1 where it is converted into a series of digital pulses. The envelope signal is then passed to a comparator 29, where it is compared with one of a number of voltages, depending on the configuration of the control lines 43 from an internal control unit 30. The comparator 29 provides the feedback signal which is passed via the line 12 to the digital device 1.

A bias unit 31 uses band-gap circuitry to generate a reference voltage VREF of nominally 1.20 volts on line 13, independent of battery voltage. All Other fixed reference voltages are derived from this voltage and include a positive reference voltage (VPR) at 1.80 V, and a negative reference voltage (VNR) at 0.60 V supplied on a reference bus 44. The positive reference voltage VPR goes to an external resistor chain 35/36/37/38 provides three reference voltages which are input into the comparator 29. The control unit 30 decodes the control information provided by the digital device 1 via lines 10, and selects which of the reference voltages is to be compared in comparator 29 with the envelope signal passed from the filter 28. The bias unit 31 also generates bias voltages for all circuit blocks on the analogue device 2 under the control of signals from the control unit 30, and includes power-up circuitry which operates only when instructed by the digital device 1. In addition, bias unit 31 generates a battery monitor voltage (VBM) also output on the bus 44

A digital to analog converter (DAC) is provided in the analog device 2 and is used to generate a control voltage for the AGC amplifier 25. The DAC is also used for analog to digital conversions using the dual slope conversion method. Analog to digital convertions are carried out by a combination of components on both the analog and digital devices 1, 2, as explained below The digital device 1, using the counter 23 and the control unit 22, control the digital to analog conversion via the control unit 30 outputting the control lines 43. The circuitry on the analog device 2 which carries out the digital to analog conversion consists of a buffer amplifier 33 having switchable inputs and an operational amplifier 34 connected as an integrator with an external resistor 39, an external capacator 40 to set the integrator characteristics, and the comparator 29. The comparator 29 output is available as a digital signal on the control bus 43. The switchable amplifier 33 is controlled by the control lines from the control unit 22.

Analog to digital conversions can be carried out on two sources VBM, a scaled version of the supply voltage, and the output of a buffer amplifier 32. The input of the buffer amplifier 32 is connected to a thermistor (not shown) located within the meter 50. The thermistor is located in one of the aerodynamic housings 53,54 to measure the temperature of the fluid. Alternatively, or additionally a thermistor can be located within the housing 50 enabling monitoring of the internal temperature which can affect the life of the battery 51. The thermistor is generally configured with a linearizing resistor (also not shown), usually arranged in parallel. The analog to digital conversions can be carried out on voltages between VPR and VREF. The preferred connection of the thermistor is such that VREF corresponds to a temperature of +60° and VPR corresponds to −20°. Current is supplied to the thermistor from an output on the digital device 1. This current is only supplied when a temperature measurement is being carried out.

The operation of the electronic circuitry of FIGS. 1, 2 and 3 can now be described, a control program for such operation residing in the ROM 16.

A scan consists of the following steps:

1. A first transmission direction is selected, and a variable number of single ringarounds are performed, with the object of determining the level of response at the receiving transducer. Trials are continued in this manner, in which the gain of the receiver 24 is adjusted until the received response falls within preset limits corresponding to a voltage between the voltages present at the connecting nodes of resistor 35 and 36, and, resistors 36 and 37. A maximum of nine such trials can be performed.
2. The high-speed timer 23 is started simultaneously with the commencement of the preset sequence of measurement ringarounds which can include any number of ringarounds, but preferably is 64.
3. At the end of the series of measurement ringarounds, the value in the counter of high-speed timer 23 is transferred to a peripheral register 19 in the digital device 1.
4. The second transmission direction is selected, and the remainder of Step 1, and Steps 2 and 3, are repeated.
5. Software in the digital device 1 then calculates the flow rate for the scan period from the high-speed timer values stored the peripheral registers 19.

Figure 4:
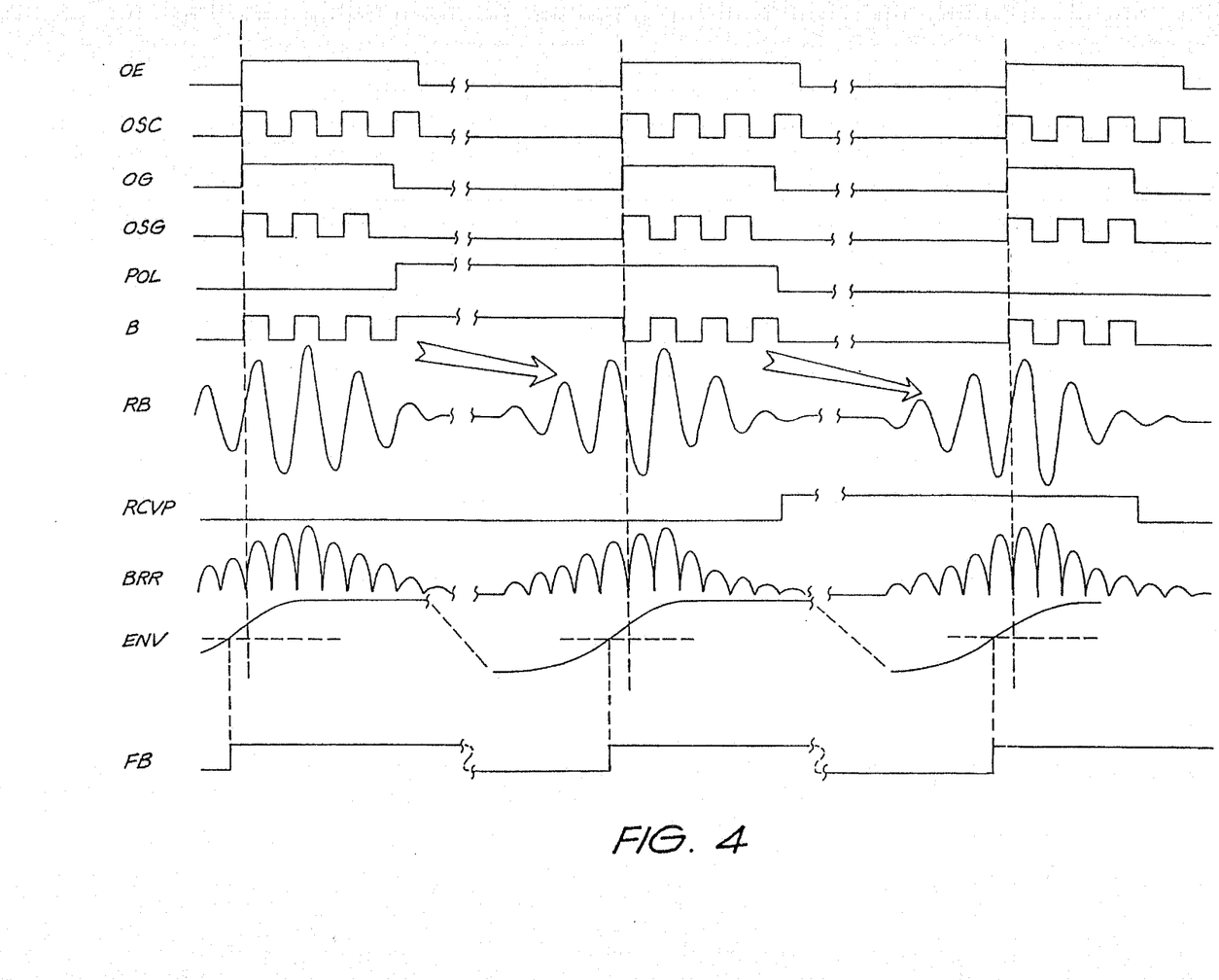
FIG. 4 is a timing diagram of signals produced by the circuits of FIGS. 1, 2 and 3.

The timing diagram of FIG. 4 shows the initiation of three ringarounds. The first is a normal-polarity ringaround, with the output remaining high in readiness for the reverse polarity or inverted phase of the second ringaround. The second, reverse-polarity burst, leaves the output low, and the final burst is normal polarity. In the preferred arrangement, one more burst identical to the last burst in the diagram is also transmitted, and the sequence continues preferably a further 15 times giving 64 ringarounds. The signals shown in FIG. 4 can be summarized as follows:

OE—Oscillator Enable. Enables the transmit oscillator OSC.

OSC—Transmit Oscillator. This signal is a square gated wave of 50% duty cycle, and has a frequency of 115 KHz in the preferred embodiment. Frequencies of between 40 KHz and 200 KHz are generally suitable.

OG—Oscillator Gate. This is enabled by the rising edge of OE, and is disabled by a pulse counter operating on rising edges of OSC. The pulse counter compares a counter limit (e.g. 3) stored in the peripheral register 19. The counter limit is set by software.

OSG—Gated Transmit Oscillator Signal. This is the basic burst form before modification by polarity reversal circuitry and is obtained by ANDing OSC and OG.

POL—Polarity. The software can write to a specific one of the peripheral registers 19 to signify that a polarity reversal of the transmitted burst is required after the current ringaround. Thereafter, the falling edge of OG causes POL to be asserted. If POL is already asserted, the falling edge of OG negates it.

B—Burst. This is the signal applied to the emitting transducer. It is obtained by XORing POL with OSG.

RB—Received Burst. This is the signal obtained from the receiving transducer and applied to the receiving preamplifier 24. A filtered version of this signal (made available on line 22 of FIG. 3) is sent to a comparator on the digital device 1.

RCVP—Receive Polarity. A high-to-low transition of POL causes RCVP to be asserted. It is negated by the next falling edge of POL. Changes in receiver polarity take place one ringaround after the transmit polarity, POL, changes. This signal represents the polarity control of a zero-crossing detector 47, implemented by a comparator, provided at an input to peripheral register 19 on line 11 for driving the control unit 22 on the digital device 1.

BRR—Burst Received Rectified. This is the output of the precision rectifier 27.

ENV—Envelope. This signal is obtained by filtering BRR, and is delayed with respect to BRR because of the time constants in the filtering process. The horizontal dotted lines indicate the detection threshold corresponding the voltage at the node of resistors 37 and 38. The envelope is applied to the comparator 29.

FB—FeedbacK. When ENV passes the detection threshold it causes FB to undergo a low to high transition. The next signal transition of the received burst signal RB of a polarity determined by RCVP asynchronously initialises a ringaround by triggering OE.

The signal generator 21 includes circuitry for the production of the OE, OSC, OG, OSG, POL and B signals.

The signals shown in FIG. 4 are each shown broken between adjacent bursts. This is because a burst is transmitted upon reception of the immediately preceding burst, and because the time taken for the burst to traverse the distance between the two transducers 5 and 6 is substantially longer than the time taken to produce the burst. When in a typical natural gas, the ultrasonic bursts travel at a speed of about 430 m/sec (the speed of sound in air is about 340 m/sec) and the time of flight is generally about 0.41 milliseconds. However, the time taken to emit the burst is generally four times the pulse period which, for a transmission frequence of 105 Khz, is about 30 microseconds. The time of flight quoted here is for sound travelling in stationary air and this time of flight will vary in the preferred embodiment depending upon the velocity of fluid flow. If the fluid is a liquid, the time of flight will be substantially shorter, due to the higher speed of sound in liquid. For example, salt water has an acoustic velocity generally between 1,200 and 1,600 metres per second which is dependent upon the salinity of the water and its temperature.

Also in FIG. 4, the arrows between trace B and trace RB indicate that the received burst is substantially aligned with the transmission of the next burst.

The steps outlined above will now be described in more detail. At first, a gain-setting step is required to ensure that the ultrasonic burst detection circuitry operates correctly. The signal generator 21 which operates between 80 and 150 KHz, but more typically at 105–125 KHz, produces a burst of one to ten pulses, typically three, which is amplified and fed to the emitting transducer. The form of this burst is shown in FIG. 4 trace B. By the time this signal reaches the output of the receiving preamplifier 24, due to the limited frequency response of the transducers 5 and 6, it has become a substantially sinusiodal wavetrain with a smooth envelope as shown in FIG. 4 trace RB. Because resonances in the transducers, and filtering effects in the electro-acoustic signal path, this envelope increases rapidly in amplitude and then tails off gradually over a number of cycles.

The signal amplitude at the output of the receiving detector preamplifier 24 varies as a function primarily of gas flow rate, temperature and direction of transmission relative to the flow of gas. In addition, the amplitude of the received signal can be increased by changing the drive mode of the emitting transducer from a single-ended drive to a double-ended drive. For single-ended drive one side only of the transducer is driven while for double-ended drive one end of the transducer is driven with the normal signal and the other side is driven with its logical complement. In general, the amplitude of the received signal cannot be predicted for any one scan, so a number of single-ringaround trial transmissions must be performed to establish the required receiver gain and transmitter driving mode to give a constant amplitude at the preamplifier output.

This process is controlled by the software in the digital device 1. The timer 41 is tied to one of the available clock signals, and capacitor 40 is charged via resistor 39 for a nominated number of clock cycles between zero and 255. The voltage on the capacitor 40 is applied to the voltage-controlled AGC amplifier 25.

A single burst is sent through the system, and the rise of the received, rectified and filtered envelope is compared in comparator 29 with three reference voltage levels. The first, and lowest, voltage is a reference voltage ETH obtained between resistors 37 and 38 which is normally used to enable zero-crossing detection. The next voltage ELL is the lowest acceptable amplitude for the peak of the received envelope obtained from a point between resistors 36 and 37, and the final reference voltage EHL is the highest acceptable envelope amplitude obtained from between resistors 35 and 36.

The AGC control voltage is generated by charging the capacitor 40 of the DAC for a nominated number of clock cycles between zero and 255. The charging current is controlled by resistor 39. The voltage on the capacitor 40 is applied to the voltage-controlled AGC amplifier 25 and is held for the duration of the received pulse.

Figure 10A:
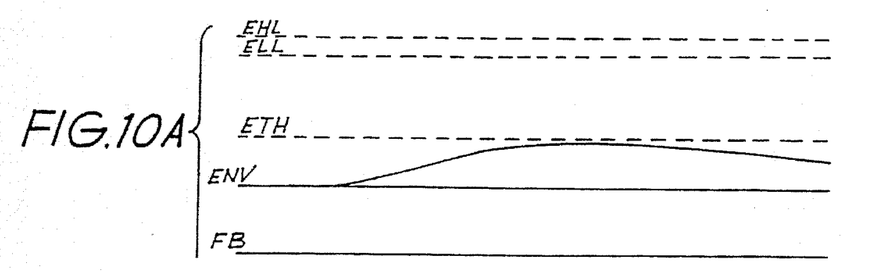
FIGS. 10A–10D illustrate waveforms relating to the gain setting process.
Figure 10B:
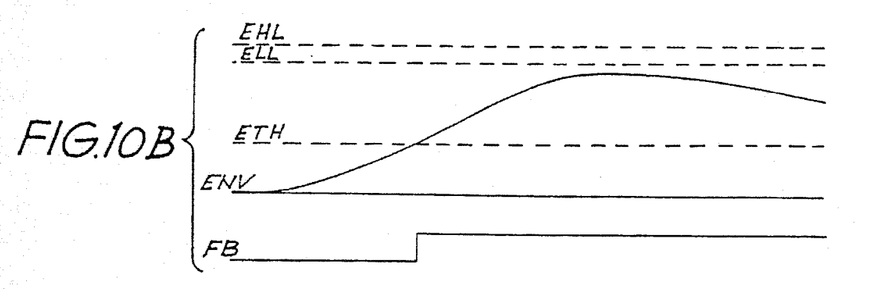
Figure 10C:
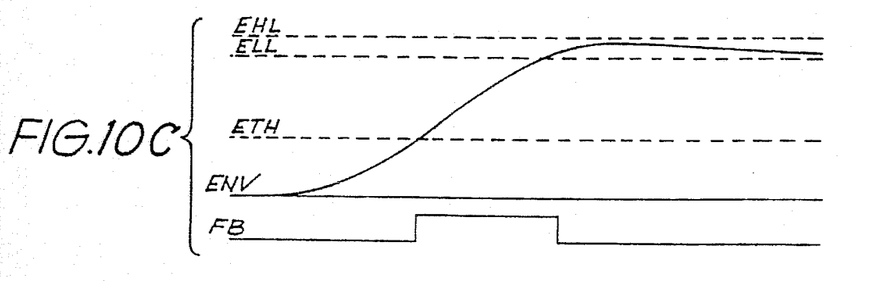
Figure 10D:
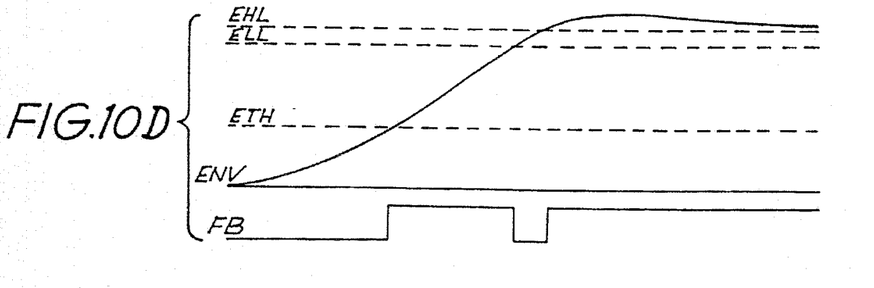

Feedback line 12, indicated by trace FB in FIGS. 10A–10D, to the digital device 1 is initially a logic 0, and changes state as each reference voltage is passed. The received signal at the output of filter 28 (trace ENV) is at a satisfactory level when the feedback line 12 undergoes transitions 0-1-0 (FIG. 10C); a steady logic 0 indicates that the received signal level is much too low (FIG. 10A), while the transition sequence 0-1 indicates that the signal peak is above the measurement reference level, but is still too low (FIG. 10B). A transition sequence of 0-1-0-1 indicates that the received signal envelope has passed through all three reference levels, and is therefore too high (FIG. 10D). This information is made available to the software via two bits in a register in the peripheral registers 19, and the software uses a binary chop algorithm, of successive trials to eliminate regions in the 0–255 range of possible charging times of the capacitor 40, to converge on a satisfactory gain. If the final gain is substantially less than 50% of the maximum possible, and if at the same time double-ended drive is being used for the emitting transducer, it is possible that single-ended drive could be used with a consequent saving of power. In this case, the software goes through the whole gain-setting procedure once more with single-ended drive. Conversely, if the received amplitude cannot be raised to a satisfactory level with single-ended drive and a capacitor charge time of 255 clock cycles, the gain-setting procedure is repeated with double-ended drive. Once a satisfactory driving mode and gain have been established, the ROM software stores these results for the ensuing sequence of measurement ringarounds, and also as a starting point for the next scan.

Still referring to FIG. 4, the burst B on the left hand side of the drawing includes four rising pulses. Accordingly, the received burst RB will commence with a rising pulse with the elapsed time between first rise of the trace B and the first rise of the trace RB being the time of flight of the ultrasonic signal. As seen in FIG. 4, the envelope ENV commences rising with the increasing envelope of the receiving burst RB. The use of high gain, low-Q transducers 5 and 6 ensure that the envelope increases rapidly such that detection may take place as earlier described. Because of this, the threshold detection in the rise of the envelope is consistently predictable and the next zero-crossing of the received burst RB is used to trigger the transmission of the next burst, and ultimately for the stopping of the counter 23 or a retransmit. Accordingly, as seen from FIG. 4, the value counted by the counter 23 corresponds to the time of flight plus two and a half oscillations at the transmit frequency, multiplied by the number of ringarounds plus, any delay caused by the electronic circuitry. A constant corresponding to two and a half oscillations multiplied by the number of ringarounds plus any electronic delay can be present within the ROM 4. This constant is deductible from the time measured in counter 23 when calculating the time of flight.

In general for any one ringaround the electronic delay is insignificant. The electronic delay is generally of the order of nanoseconds while the time of flight will be of the order of 0.5 milliseconds.

The central problem in accurately timing the arrival of the burst is to pick a point which can be consistently identified despite relative movement between the burst envelope and its constituent sinusiodal waves. The preferred method described herein is to select a particular zero-crossing point in the early part of the received wavetrain, corresponding to when the pulse is driven rather than resonating, and to use this zero-crossing point as the timing marker. It is preferred to perform the detection in the driven part of the waveform, since the frequency and phase of this portion is locked to the transmitted waveform. The later part of the waveform is the result of resonances, and may not accurately reflect the frequency of the original ultrasonic burst.

To accomplish this detection, the received signal is rectified (trace BRR) in the unit 27 and filtered in unit 28 to recover the envelope shade as shown in FIG. 4 trace ENV. The rising portion of the filtered envelope is compared in comparator 29 with a reference voltage obtained at the node between resistors 37 and 38. When the envelope ENV reaches the reference voltage, the zero-crossing detector 47 in the digital device 1 is enabled for a limited time (at least one cycle and no more than two cycles of the chosen ultrasonic frequency), and the next transition of a digitised derivative form of the unfiltered received signal RB on the line 11, corresponding to the next zero crossing of RB is used as the timing reference point to register the arrival of the burst. To achieve useful results, the reference voltage must be a fixed proportion of the peak amplitude of the received envelope emanating from filter 28, as indicated by the dotted line in FIG. 4 trace ENV.

Returning to the commencement of a ringaround sequence, the ROM software initialises a counter which will terminate at the required number of ringarounds, and then causes the ringaround sequence to commence by writing a code to a control register in peripheral register bank 19 from where it passes to control unit 22. The writing of this commencement code also starts the high-speed counter 23, running at 9.3804 MHz. Finally, the ROM 16 software executes a WAIT instruction. The control unit 22 commences a sequence of events which is largely automated. In this mode, the detection of a specific zero crossing of an arriving ultrasonic burst at the receiver transducer (5 or 6) causes an immediate retransmission. The next signal transition of RB on line 11 which is of appropriate polarity asynchronously triggers a retransmission. The feedback signal 12 awakens the ALU 15 from its WAIT state. Upon the awakening of the ALU 15, the ROW software updates its ringaround count and checks whether the limit has been approached. If the ringaround count has reached one count less than its predetermined limit, the software nullifies the commencement code originally written to control unit 22, thus breaking the retransmission loop and terminating the sequence after the next ringaround. The software then resets the flag bit which caused the wakeup, and another WAIT instruction is executed. This software activity all occurs during the time-of-flight of the acoustic signal along the tube 52, independently of the automated process of detection and retransmission.

In the third step, the 24-bit value in the high-speed counter 23 register is read by the ROM software and placed into the RAM 17 for future use in the flow calculations.

Finally, the software performs two long divisions, dividing the high-speed timer counts, corrected for electronic delay, into a meter calibration factor, preprogrammed into the meter after testing and prior to use. As earlier described, most of the electronic delay arises from the fact that the arrival of the front of the ultrasonic burst cannot be detected. Rather, a zero-crossing some fixed number of cycles (2½) into the burst is detected. In addition, there are phase lags in the transducers 5,6 and other components in the detection chain. The number of timer counts corresponding to the electronic delay is fixed and known for any particular meter configuration, and is stored in EEPROM 4. The difference between the long division results, together with the interscan time, is used to calculate a flow for the scan period. This flow is then added to an accumulated gas register for display and automated readout.

Gas usage may be accumulated in one of two registers, depending on the time of day, so that off-peak billing may be performed if desired.

Gas temperature is measured by means of a thermistor (not illustrated) attached to one of the aerodynamic housings (53 or 54) and connected to one of the inputs of operational amplifier 32, and the software applies a temperature correction to the flow derived for the scan period.

Because the preferred embodiment is primarily intended for domestic application using long life lithium batteries, the conservation of electrical energy is of critical importance and a number of steps have been taken to reduce energy consumption.

Firstly, the 9.3804 MHz clock signal for the high-speed timer is generated digitally from a 4.9152 MHz oscillator in clock unit 18. The high power requirement of a high-speed oscillator is thus reduced. This conserves power because the crystal, which sets the base oscillation frequency, consumes the majority of the power in the clock circuit and by operating the crystal at "half" speed, energy savings of 75% can be achieved.

Secondly, the liquid crystal display 7 is only activated when the protective cover 59 is lifted and the Reed switch 8 actuated, and the software ensures that it remains activated for only a limited time in the event that the cover 59 is propped open.

Thirdly, the external communications circuitry in the communications block 20 normally operates in a polling mode of 1 millisecond in 500 ms, and is only fully activated on receipt of valid communications input.

Fourthly, the use of low-Q transducers 5 and 6, such as those disclosed in International Patent Application No. PCT/AU91/00157, ensures a low driving power for generating the ultrasonic signal.

Also, the technique of storing the gain value for the last scan ensures that in most cases the binary chop method for determining the required gain does not have to be used, and only a single check ringaround need be performed at the start of a scan to confirm that the gain is correct.

Finally, the ALU 15 and its associated components are in a low-Dower halted state for most of the time, and are only woken by an interrupt from the external communications block, or by an interrupt from the real-time clock requesting a scan.

Referring to FIGS. 5 to 9, the meter 50 has a housing 61 preferably formed of die cast zinc or aluminum, although other metals or plastics material can be used. The tube 52 is formed integrally with the housing 61 seen in FIGS. 8 and 9. A cover 62 is fixed to the housing 61 using a number of fastening screws 63 seen in FIG. 6. A neoprene seal 71 is provided between the housing 61 and cover 62. A battery compartment cover 64 is fixed to the housing 61 by fastening screws 65, seen in FIGS. 5 and 9.

Figure 8:
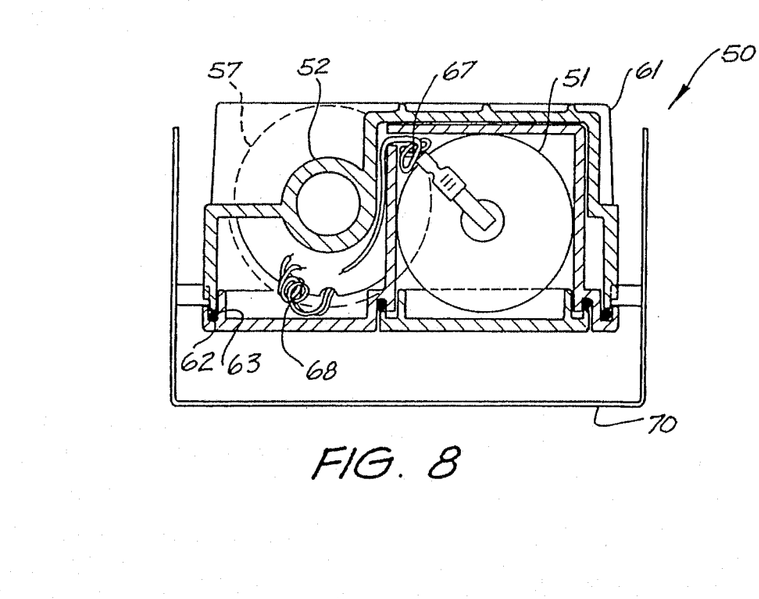
FIG. 8 is a cross-section of the gas meter taken along the VIII—VIII of FIG. 5.
Figure 9:
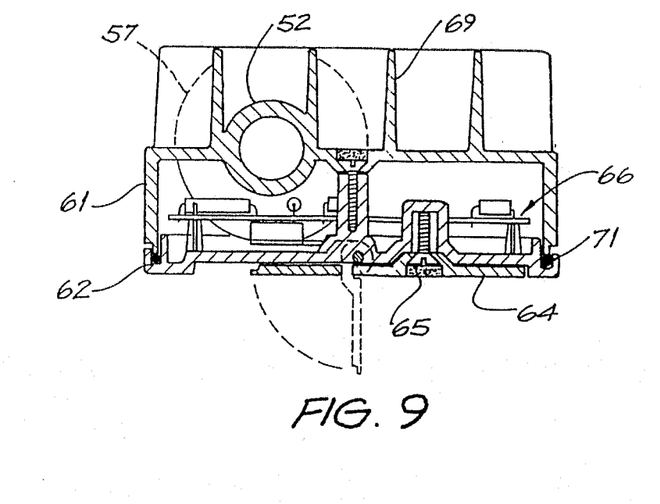
FIG. 9 is a cross-section of the gas meter taken along the line IX—IX of FIG. 5.

The electronic components of FIGS. 1, 2 and 3 are arranged on a printed circuit board (PCB) 66, seen in FIG. 9 and wires 67 seen in FIG. 8 lead from the batteries 51 to the PCB 66, and wires 68 from the PCB 66 to the transducers 5 and 6 located within the tube 52.

The housing 61 is also provided with a large number of fins 69 formed integrally therewith which assist in dissipating heat from the meter 50. Because the meter 50 is intended for use in a variety of climates worldwide, and the possibility of degradation of operation caused by excessive heat damaging the battery 51, it is important to ensure that only moderate temperature rises occur within the housing 61.

This is also assisted by painting the housing using a white-coloured anti-graffiti type paint. This ensures that householders are not able to paint the housing 61 to a colour of their own choice and hence affect the heat dissipation of the meter 50.

Figure 7:
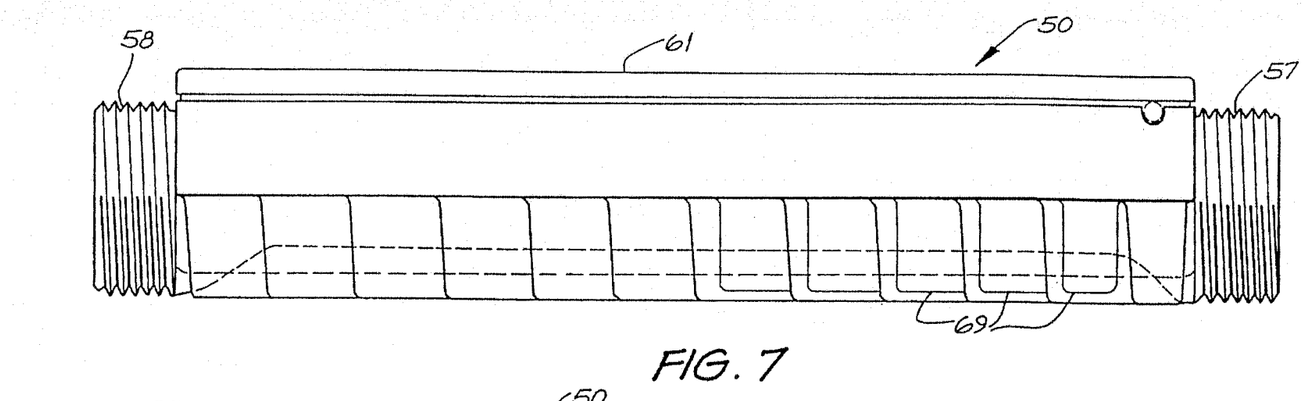
FIG. 7 is a side elevation view of the gas meter housing.

As seen in FIGS. 5, 7 and B, a solar cover 70 can be provided about the housing 61 to augment rejection of direct solar radiation. The cover 71 should be perforated to allow for air circulation about the fins 71 and may be painted by a householder to improve appearance.

As seen in FIG. 4, the preferred embodiment makes use of a burst or acoustic wave packet that has its polarity or phase inverted with respect to adjacent packets. In FIG. 4, the first and third bursts commence with a positive-going transition whereas, the second burst commences with a negative-going transition. Alternatively, the first and third burst may commence with a negative-going transition This arrangement, which is specifically disclosed in Australian Patent Application No. PK6894 lodged 25 Jun. 1991 concurrently with the present application by the same applicants and entitled "Mode Suppression in Fluid Flow Measurement" the disclosure of which is hereby incorporated by cross-reference, acts to substantially reduce the propagation of high order acoustic modes within the tube 52, those high order modes causing errors in the detection of the receipt of an acoustic wave packet by the receiving transducer. Most preferably, an inverted acoustic wave packet is transmitted for every three packets having like initial phase. The errors are caused by multipath propagation of the acoustic wave packet in which the spread of the acoustic wave from the transducers 5 and 6 reflects off the walls of the tube 52. Thereby, the high order modes propagate at velocities substantially less than the basic or primary mode for which detection is required as it is the primary mode and its change in acoustic velocity that is important in fluid flow measurements.

The preferred embodiment provides linear measurement over the range 0–7 cubic metres per hour at a nominal accuracy of 0.1–0.15% for a 12.5 mm tube and better than ±2% for the top 75% of the flow range.

The foregoing describes only one embodiment of the present invention and modifications, obvious to those skilled in the art, can be made thereto without departing from the scope of the present invention.

For example, the optical interface can be readily replaced by a radio frequency or magnetic induction arrangement.

Also, for industrial standards, or custody transfer applications, mains power, as opposed to battery operation, can be provided.

Also, for large mains lines, it is possible to locate the entire meter within the line.

In addition, the transducers need not be mounted with a pipe or conduit. For example, If the transducers were mounted on the exterior of a hull of a ship, the meter would thereby act to determine the relative speed of the ship through water. This would include measuring water current speeds when the ship is physically stationary. Such current speeds add to the real speed of the ship. The thermistor can be used to measure the sea water temperature and accordingly allow compensation of the acoustic velocity in water. This can also depend on salinity, and a separate salinity measuring device (not shown) can also be used to compensate the acoustic velocity of the water.

Also, the zero-crossing detector 47 of the digital device 1 can have its input offset minimised by alternating the polarity of the transmit sequence such that if the first transmit for a ringaround is positive, then the next ringaround sequence has a first transmit which is negative.

Industrial Applicability

The present invention is applicable to the measurement of fluid flow, especially gases.

We claim:

1. A method of detecting the time of arrival of an acoustic wave packet comprising at least three cycles and not more than five cycles transmitted at a particular frequency, said method comprising the steps of detecting the wave packet and forming a received signal therefrom, rectifying and filtering the received signal to form an envelope signal, detecting when said envelope signal crosses a detection threshold to thereby enable the detection of a transition across a predetermined level by said received signal, the transition across said predetermined level occurring during said cycles and representing a determinable number of cycles of said received signal at said particular frequency after the arrival of said acoustic wave packet, said determinable number of cycles being two and one half cycles.

2. A method as claim 1 wherein said predetermined level is a zero crossing level of an oscillatory signal.

3. A method of determining the flow velocity of a fluid, said method comprising the steps of:

(i) transmitting an acoustic wave packet from a first transducer to a second transducer, both located in said fluid, and starting a timer concurrently therewith;

(ii) detecting a time of arrival of said wave packet at said second transducer using a method as claimed in any one of claims 1 to 2 in which said timer is stopped upon said transition of said predetermined level;

(iii) correcting a time value provided by said timer by a predetermined period corresponding to said determinable number of cycles; and (iv) using the corrected time value, separation distance of said transducers, and known acoustic velocity in said fluid when stationary to determine said flow velocity.

4. A method of determining the flow velocity of a fluid, said method comprising the steps of:

(i) transmitting an acoustic wave packet from a first transducer to a second transducer, both located in said fluid, and starting a timer concurrently therewith;

(ii) detecting a time of arrival of said wave packet at said second transducer using method as claimed in any one of claims 1 to 2 in which said timer is stopped upon said transition of said predetermined level;

(iiii) correcting a time value provided by said timer by a predetermined period corresponding to said determinable number of cycles; and (iv) using the corrected time value, separation distance of said transducers, and known acoustic velocity in said fluid when stationary, to determine said flow velocity wherein steps (i) and (ii) are repeated a plurality of times in which said time value accumulates and is subsequently corrected using a like plurality of said predetermined periods, and the corrected time value is averaged by dividing by said plurality.

5. A method as claimed in claim 4 wherein said repetition also comprises transmitting from said second transducer to said first transducer.

6. A method as claimed in claim 4 the transmission of a wave packet, save for the first, is instigated upon the transition of said predetermined level by the immediately preceding wave packet.

7. A method as claimed in claim 6 wherein a selected one or more of the plurality of wave packets is transmitted having its phase or polarity inverted with respect to the immediately adjacent wave packets.

8. A method as claimed in claim 7 wherein one inverted wave packet is transmitted for every three having like phase.

9. An electronic fluid flow meter comprising first and second transducers located within a fluid, transmitter means for energising one of said transducers to cause emission of one or more acoustic wave packets therefrom for reception by the other said transducer, control means connected to said transmitter means for reversing the direction of transmission of said acoustic wave packets, timer means connected for enablement to said control means for measuring a time of flight of each said acoustic wave packet, said timer means being stopped by a trigger signal output from a receiver means connected to said transducers, said receiver means detecting an increasing envelope of a received signal and upon the passing of predetermined threshold by said envelope, said trigger signal being output upon the next transition across a predetermined level by said received signal, wherein said next transition represents a determinable number of cycles at a known frequency of a received signal corresponding to one said wave packet, after the receipt of said one wave packet, the value in said timer means being correctable by a period of said determinable number of cycles to give the actual time of flight of each said wave packet.

10. A meter as claimed in claim 9 further comprising a processing means for averaging a plurality of said actual times, and using the averaged actual time, the separation distance between said transducers and the known acoustic velocity in said fluid when stationary, determining the flow velocity of said fluid.

11. A meter as claimed In claim 10 further comprising a permanent storage means for storing flow volume values determinable by said processing means based upon physical dimensions of a duct through which said fluid flows at said flow velocity aria in which said transducers are located.

12. An electronic fluid flow meter comprising first and second transducers locatable within a fluid, transmitter means for energising one of said transducers to cause emission of one or more acoustic wave packets therefrom for reception by the other said transducer, control means connected to said transmitter means for reversing the direction of transmission of said acoustic wave packets, timer means connected for enablement to said control means for measuring a time of flight of each said acoustic wave packet, said timer means being stopped by a trigger signal output from a receiver means connected to said transducers, said receiver means detecting an increasing envelope of a received signal and upon the passing of predetermined threshold by said envelope, said trigger signal being output upon the next transition across a predetermined level by said received signal wherein said transducers are ultrasonic transducers and emit said wave packets at a predetermined frequency between 40 kHz and 200 kHz.

13. A meter as claimed in claim 9 wherein said timer means operates at a clock rate substantially higher than a transmit frequency of said wave packets.

14. A meter as claimed in claim 12 wherein said predetermined frequency is about 110 kHz.

15. A meter as claimed in claim 13 wherein said clock rate is excess of 1 MHz.

16. A meter as claimed In claim 15 wherein said clock rate is about 9.4 MHz.

17. A meter as claimed in claim 9 wherein said receiver means includes gain adjustment means for automatically periodically adjusting a receiver gain to ensure that said predetermined threshold is within said increasing envelope.

18. A meter as claimed in claim 11 further comprising interface means permitting communication of data stored in said permanent storage means to an external interrogation device.

19. A meter as claimed in claim 18 wherein said interface means includes a two-way serial link.

20. A meter as claimed in claim 18 wherein said interface means utilizes communications afforded by emissions selected from the group consisting of infra-red light, radio frequency and magnetic induction.

21. An electronic fluid flow meter comprising first and second transducers locatable within a fluid, transmitter means for energising one of said transducers to cause emission of one or more acoustic wave packets therefrom for reception by the other said transducer, control means connected to said transmitter means for reversing the direction of transmission of said acoustic wave packets, timer means connected for enablement to said control means for measuring a time of flight of each said acoustic wave packet, said timer means being Stopped by a trigger signal output from a receiver means connected to said transducers, said receiver means detecting an increasing envelope of a received signal and upon the passing of predetermined threshold by said envelope, said trigger signal being output upon the next transition across a predetermined level by said received signal wherein said predetermined level is a zero amplitude level and said next transition is detected using a zero-crossing detector.

22. A meter as claimed in claim 9 further comprising a battery power source supplying energy to said transmitter means, said control means periodically enabling operation of said meter for the transmission of said wave packets.

23. A meter as claimed in claim 22 wherein said battery power source provides a service life of said meter between one and eight years.

24. An electronic fluid flow meter comprising first and second transducers locatable within a fluid, transmitter means for energizing one of said transducers to cause emission of one or more acoustic wave packets therefrom for reception by the other said transducer, control means connected to said transmitter means for reversing the direction of transmission of said acoustic wave packets, timer means connected for enablement to said control means for measuring a time of flight of each said acoustic wave packet, said timer means being stopped by a trigger signal output from a receiver means connected to said transducers, said receiver means detecting an increasing envelope of a received signal and upon the passing of predetermined threshold by said envelope, said trigger signal being output upon the next transition across a predetermined level by said received signal wherein said transmitter means outputs a plurality of said wave packets in a ringaround sequence in which after every three wave packets transmitted having like phase, a wave packet is transmitted of opposite, inverted phase, thereby substantially reducing errors caused by the propagation of high order acoustic modes between said transducers.

25. A meter as claimed In claim 22 further comprising a housing via or through which said fluid is permitted to flow and within which components of said meter are locatable.

26. A meter as claimed in claim 25 wherein said housing comprises a plurality of fins and an external surface thereof thereby facilitating amelioration of temperature rises within said housing.

27. A meter as claimed In claim 25 in which said housing comprises a cover incorporating a foldable section said cover permitting access to said battery power source and said foldable section permitting manual access to an interface port adapted for communications between said meter and an external device.

28. A meter as claimed in claim 27 wherein said foldable section permits access to a display means energised for operation upon opening of said foldable section, said meter being configured for the display of operational data using said display means.

29. An electronic fluid flow meter comprising first and second transducers locatable within a fluid, transmitter means for energising one of said transducers to cause emission of one or more acoustic wave packets therefrom for reception by the other said transducer, control means connected to said transmitter means for reversing the direction of transmission of said acoustic wave packets, timer means connected for enablement to said control means for measuring a time of flight of each said acoustic wave packet, said timer means being stopped by a trigger signal output from a receiver means connected to said transducers, said receiver means detecting an increasing envelope of a received signal and upon the passing of predetermined threshold by said envelope, said trigger signal being output upon the next transition across a predetermined level by said received signal further comprising thermal compensation means configured to compensate for thermal drift in operation of said meter.

30. A meter as claimed in claim 29 wherein said thermal compensation means comprises a thermal transducer located in said fluid and permitting compensation of errors caused by changes in fluid temperature.

31. A meter as claimed in claim 29 wherein said thermal compensation means comprises a thermal transducer located in a housing enclosing said meter and permitting compensation of errors caused by changes in temperature within said housing.

32. A method as in claim 1 wherein said detection threshold lies between maximum and minimum predetermined desired values at or near a peak amplitude of said envelope signal.

33. A meter as in claim 9, wherein said predetermined threshold lies between maximum and minimum predetermined desired values at or near a peak amplitude of said envelope.

* * * * *